(12) United States Patent
Sorensen

(10) Patent No.: US 7,091,880 B2
(45) Date of Patent: Aug. 15, 2006

(54) LICENSED DRIVER DETECTION FOR HIGH OCCUPANCY TOLL LANE QUALIFICATION

(75) Inventor: Roger G. Sorensen, Chino Hills, CA (US)

(73) Assignee: Raytheon Company, Waltham, MA (US)

( * ) Notice: Subject to any disclaimer, the term of this patent is extended or adjusted under 35 U.S.C. 154(b) by 86 days.

(21) Appl. No.: 10/891,824

(22) Filed: Jul. 15, 2004

(65) Prior Publication Data

US 2006/0015394 A1   Jan. 19, 2006

(51) Int. Cl.
*G08G 1/00* (2006.01)

(52) U.S. Cl. ............... 340/928; 340/905; 340/988; 340/991; 340/531; 340/572.1; 340/438; 340/825.36; 705/13; 705/35

(58) Field of Classification Search ............ 340/928, 340/905, 988, 991, 531, 572.1, 572.4, 572.9, 340/10.4, 10.42, 10.51, 901, 438, 825.36; 705/13, 35, 40; 701/3, 24
See application file for complete search history.

(56) References Cited

U.S. PATENT DOCUMENTS

| | | | |
|---|---|---|---|
| 5,086,389 A | 2/1992 | Hassett et al. | |
| 5,144,553 A | 9/1992 | Hassett et al. | |
| 5,289,183 A | 2/1994 | Hassett et al. | |
| 5,459,304 A * | 10/1995 | Eisenmann | 235/380 |
| 5,920,057 A | 7/1999 | Sonderegger et al. | |
| 6,525,673 B1 | 2/2003 | Feldman | |
| 2004/0233046 A1* | 11/2004 | Gotfried et al. | |

FOREIGN PATENT DOCUMENTS

| | | |
|---|---|---|
| DE | 195 25 762 A1 | 1/1997 |
| DE | 197 11 521 A1 | 9/1998 |
| EP | 1 508 878 A1 | 2/2005 |
| WO | WO 2004/038663 A1 | 5/2004 |

OTHER PUBLICATIONS

Cunningham, R. F., Smart Card Applications in Integrated Transit Fare, Parking Fee and Automated Toll Payment Systems The Maps Concept, Telesystems Conference, 1993, pp. 021-025.
Copy of International Search Report for PCT/US2005/025162 dated Nov. 18, 2005.

* cited by examiner

*Primary Examiner*—Hung Nguyen
(74) *Attorney, Agent, or Firm*—Daly, Crowley, Mofford & Durkee, LLP

(57) ABSTRACT

A method for collecting tolls on a high occupancy toll lane includes detecting a number of driver's licenses inserted into a card reader located in a vehicle and transmitting the number of driver's licenses to a roadside transceiver for a determination of a toll amount for the vehicle based on the number of driver's licenses. A transponder for use with the method includes a card reader for reading information from one or more driver's licenses inserted into the card reader and a processor operative to generate a licensed driver count related to the number of driver's licenses inserted into the card reader. In one embodiment, the processor is operative to determine whether or not a driver's license is valid and the licensed driver count is indicative of the number of valid driver's licenses inserted into the card reader.

17 Claims, 3 Drawing Sheets

LICENSED DRIVER DETECTION FOR HIGH OCCUPANCY TOLL LANE QUALIFICATION

CROSS-REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to high occupancy toll lanes and more particularly, to apparatus and techniques for detecting the number of licensed drivers in a vehicle for use in determining high occupancy toll lane qualification.

BACKGROUND OF THE INVENTION

Automated toll collection systems are known. Typically, these systems comprise a reader transponder or transceiver and at least one vehicle transponder. The reader transceiver includes either laneside, overhead or in-pavement antennas in each traffic lane. The reader transceiver senses the presence of the vehicle transponder by employing a vehicle sensor or by transmitting an RF signal to which the vehicle transponder responds with an identification message.

High occupancy toll (HOT) lanes are in use in many states in an effort to reduce highway demand. In specially designated HOT lanes, vehicles having at least a predetermined number of occupants, such as two or three, (i.e., high occupancy vehicles, or HOVs) are given a discounted toll rate or are not required to pay a toll at all. Single occupancy vehicles (SOVs) may be permitted to use the HOT lanes, but are required to pay a higher toll.

Enforcement of HOT lane qualification is typically performed by having a police officer monitor passing vehicles to ensure that the threshold number of occupants are present in cars using the HOT lanes or benefiting from the reduced or eliminated tolls. Such enforcement is only effective when a police officer is present and is a costly enforcement approach.

SUMMARY OF THE INVENTION

According to the invention, a method of collecting tolls on a high occupancy toll lane includes detecting a number of driver's licenses inserted into a card reader located in a vehicle using the high occupancy toll lane and transmitting the number of driver's licenses to a roadside transceiver for a determination of a toll amount for the vehicle based on the number of driver's licenses. Detecting the number of driver's licenses inserted into the card reader is intended to, and generally does, provide an indication of the number of licensed drivers in the vehicle. By determining a toll amount for the vehicle based on the number of licensed driver occupants, the intent of HOT lanes, of reducing highway demand, is served.

The method of collecting tolls may include one or more of the following features. Detecting the number of driver's licenses includes reading information from at least one of a bar code and a magnetic strip on the driver's license. Detecting the number of driver's licenses may include determining if each of the driver's licenses inserted into the card reader is valid, in which case transmitting includes transmitting the number of valid driver's licenses to the roadside transceiver.

Also described is a transponder located on a vehicle, adapted for use on a high occupancy toll lane, and comprising a card reader and a processor. The card reader is operative to read information from one or more driver's licenses inserted into the card reader and the processor is operative to generate a licensed driver count related to the number of driver's licenses inserted into the card reader. The transponder further includes a transmitter for transmitting a radio frequency signal indicative of the licensed driver count to the transceiver.

According to a further aspect of the invention, a toll collection system includes the above-described transponder and a transceiver positioned adjacent to a lane and including a receiver for receiving RF signals from the transponder. In one embodiment, the transceiver comprises a processor that is responsive to the licensed driver count for determining a toll amount for the vehicle. The processor may be further responsive to a current level of service for determining the toll amount for the vehicle. And the licensed driver count may be indicative of the number of valid driver's licenses inserted into the card reader.

BRIEF DESCRIPTION OF THE DRAWINGS

The foregoing features of this invention, as well as the invention itself may be more fully understood from the following description of the drawings in which.

DESCRIPTION OF THE PREFERRED EMBODIMENT

Figure 1:
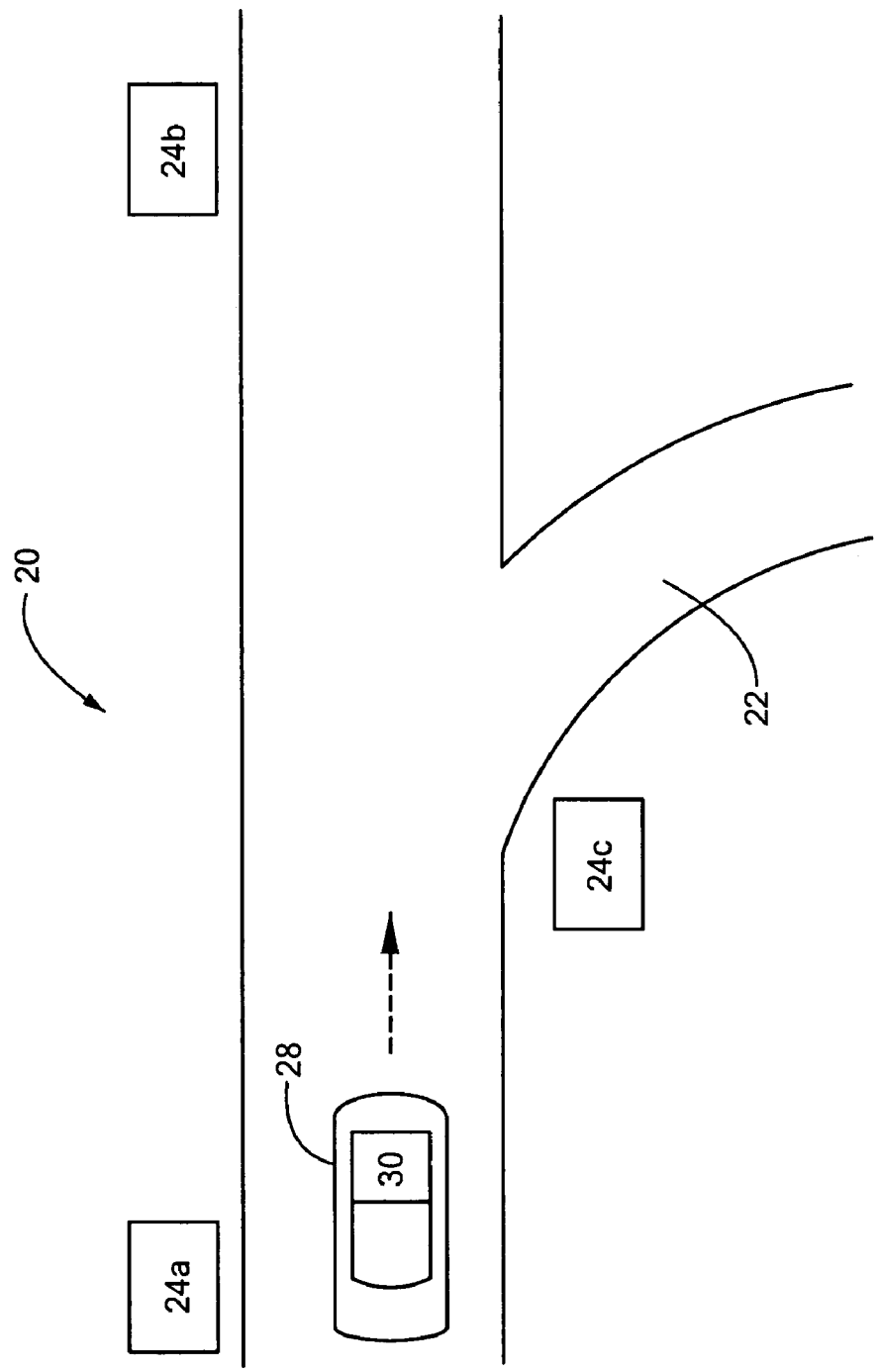
FIG. 1 shows a high occupancy toll lane utilizing a toll collection system and method according to the invention.

Referring to FIG. 1, an illustrative high occupancy toll (HOT) roadway, or lane 20 has one or more transceivers positioned along the roadway, three of which 24a, 24b, 24c are shown. According to the invention, vehicles having at least a predetermined number of licensed driver occupants are given a discounted toll rate or are not required to pay a toll at all. To this end, vehicles, such as the illustrated vehicle 28, must be equipped with a transponder 30 according to a further aspect of the invention in order to receive the toll benefits of the HOT lane 20. As will be described further in conjunction with FIG. 2, the transponder 30 includes, or is coupled to, a card reader for detecting a number of driver's licenses inserted into the card reader. The transponder 30 also includes a transmitter for transmitting information including the number of detected driver's licenses to a roadside transceiver 24a–24c for a determination of a toll amount for the vehicle based on the number of driver's licenses.

Each of the transceivers 24a, 24b, 24c includes a receiver for receiving information in the form of RF signals from vehicles passing a predetermined area of coverage. The transceivers generally also include a transmitter for transmitting information in the form of RF signals to a vehicle passing through the predetermined coverage area. The transceivers may also contain a processor and a memory. Commercially available transceivers of this type include the ASTMv6 of Raytheon Company, Lexington, Mass., the Mark IV IVHS Standard Reader of Mark IV IVHS, Ontario, Canada and the IDentity Title 21 of Sirit Technologies Inc. of Ontario, Canada. Alternatively, the processor and memory may be part of a separate unit, such as a central computer system coupled to one or more transceivers.

In operation, the transceivers 24a–24c may transit an RF signal to which a vehicle transponder 30 passing through the coverage area responds by transmitting various information pertaining to the vehicle, as will be described. While the transceivers 24a, 24b, and 24c are shown to be located along the side of the HOT lane 20, it will be appreciated that the transceivers may, alternatively, be located underneath or above a portion of the roadway. For simplicity, the transceivers 24a–24c may be referred to herein generally as roadside transceivers. It will also be appreciated that the number of transceivers shown in FIG. 1 is illustrative only and that the number can be readily varied to suit a particular toll collection system according to various parameters. A single HOT lane 20 is shown in FIG. 1 for simplicity of illustration. It will be appreciated however that the invention can be practiced in connection with roadways having any number of HOT lanes.

The HOT lane 20 may follow a closed toll collection model or an open toll collection model. In a closed toll collection model, roadway users are charged based on a trip on the roadway, by requiring payment of a toll upon exiting the roadway, which toll amount is based on the location at which the vehicle entered the roadway. In conventional closed toll collection systems, drivers receive a ticket upon entering the roadway and pay a toll related to the distance traveled at a toll booth upon exiting the roadway. In a closed toll collection system according to the invention, communication between the vehicle transponder 30 and a transceiver 24a located at or near the entry point at which the vehicle enters the roadway provides an indication of the entry point and the toll amount is determined at the time the vehicle passes another transceiver at or near the exit point at which the vehicle exits the roadway, such as transceiver 24c for a vehicle exiting the roadway 20 at an exit point 22.

In an open toll collection system, the vehicle 28 is assessed a toll amount when it passes a predetermined point on the roadway, for example, when the vehicle passes transceiver 24a. This model is typical of toll bridges and single entrance/exit expressways.

Figure 2:
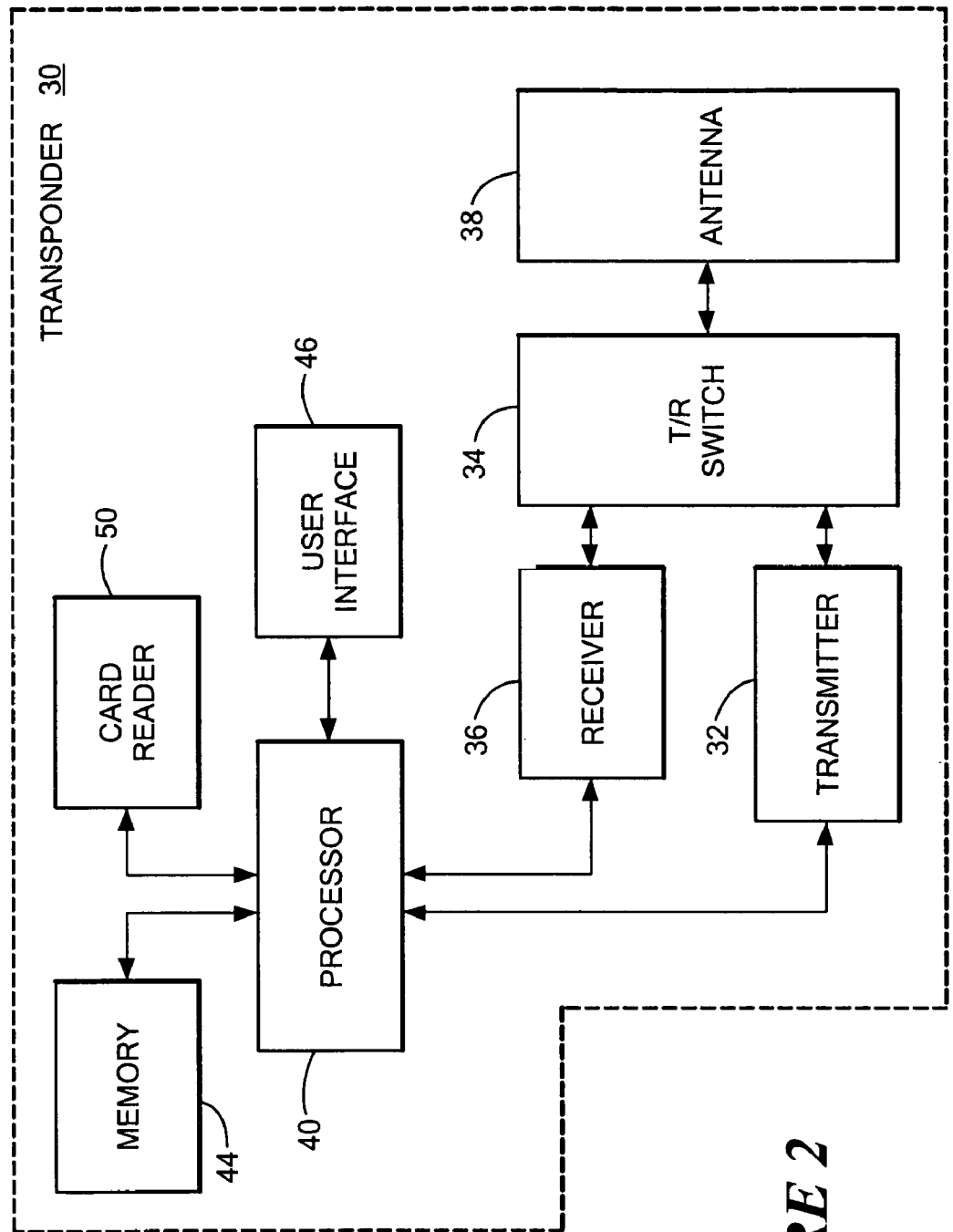
FIG. 2 is a block diagram of a vehicle transponder shown in FIG. 1.

Referring also to FIG. 2, a block diagram of an illustrative transponder 30 having a card reader 50 for reading information from driver's licenses according to the invention is shown. As will be appreciated, while the card reader 50 is shown contained within the transponder 30, the card reader can readily be provided as an external unit coupled to the transponder. In fact, it may be desirable to provide the card reader as an external unit in order to enable the use of conventional, commercially available transponders. For example, in one illustrative embodiment, the transponder is a Mark IV type III Fusion transponder available from Mark IV IVHS of Amherst, N.Y. The card reader 50 employs conventional technology for reading a bar code or magnetic strip information from the inserted driver's licenses and preferably includes a plurality of slots in order to simultaneously read more than one driver's license and permit a requirement that the driver's licenses remain in the card reader during use of the roadway. However, it is possible to achieve benefits of the invention with a card reader having only a single slot to read one inserted driver's license at a time.

The transponder 30 includes an RF transmitter 32 and an RF receiver 36 coupled through a transmit/receive (T/R) switch 34 to an antenna 38. The transponder 30 may be an active transponder that utilizes the transmitter 32 and antenna 38 to transmit RF signals to the roadside transceiver or alternatively, may be a passive transponder that reflects energy received from the roadside transceiver in a modulated fashion. The transponder 30 further includes a processor 40, a memory 44, and a user interface 46. In one embodiment, the memory 44 contains an EPROM for storing control software and a RAM for storing information, such as information read by the card reader 50. The processor 40 may be of any suitable type, such as an Intel® microprocessor. The antenna 38 can be incorporated into the transponder 30 or, alternatively, may be external to the transponder, such as in the case of a conventional window mounted antenna.

The user interface 46 can be used to provide certain information to a vehicle occupant. For example, in the illustrated embodiment, the numbers of driver's licenses detected by the card reader 50 may be provided, such as with an LCD display, an LED display, or an audio module to convey an audio indication.

Additional conventional elements of the transponder 30 that are not shown for simplicity of illustration include a power supply, such as a user-replaceable battery, and a bi-directional communication port, such as an RS232 port, that enables other processors to write data into and read data from the memory 44, such as in embodiments in which it is desirable to split the transponder function, card reader function and processor function into separate boxes and allow communications between them. The transponder 30 can be housed in a compact, portable enclosure adapted for removable attachment to a dashboard, windshield or other convenient location on the vehicle.

When it is desired to establish qualification for HOT lane toll benefits, the driver's licenses of the licensed drivers in the vehicle 28 are inserted into a card reader 50. In one embodiment, it is required that the driver's licenses remain in the card reader during use of the roadway 20. The card reader 50 reads and stores information contained on one or more driver's licenses inserted into it. Generally, such information is read from a magnetic strip or a bar code on the driver's license according to conventional techniques. Typically, the magnetic strip or bar code on a driver's license contains some or all of the information printed on the license, such as the name, age, height, and gender of the driver, the driver's social security number or other license number, the class of vehicles that the driver is licensed to operate, and the expiration date of the license.

The processor 40 receives the driver's license information read by the card reader 50. In one embodiment, the processor processes the read information and provides a licensed driver count that is indicative of the number of driver's licenses inserted the card reader 50 for transmission by the transmitter 32 to transceivers 24a–24c. As will be appreciated, detecting the number of driver's licenses inserted into the card reader is intended to, and generally does, provide an indication of the number of licensed drivers in the vehicle. In an alternative embodiment, the processor 40 processes the read information to determine a number of valid driver's licenses and provides a licensed driver count that is indicative of the number of valid driver's licenses inserted into the card reader, such as may be achieved by indicating as valid only those driver's licenses that have not expired and/or that are contained on a valid license number list that may be downloaded to the transponder 30 via RF signals from the roadside transceiver. And in yet another alternative embodiment, the raw data read by the card reader 50 is transmitted by transmitter 32 to transceivers 24a–24c for a determination of the number of driver's licenses and/or valid driver's licenses inserted into the card reader.

When a vehicle 28 with a transponder 30 enters a coverage area of the roadway into which an RF signal is transmitted by a transceiver 24a–24c, the transponder 30 decodes information in the transmitted signal. In the illustrated embodiment, the RF signal transmitted by the transceivers prompts the transponder 30 to transmit an RF signal containing at least, an identifier of the vehicle 28 and/or of the transponder 30 and, according to an embodiment of the invention, a licensed driver count.

Figure 3:
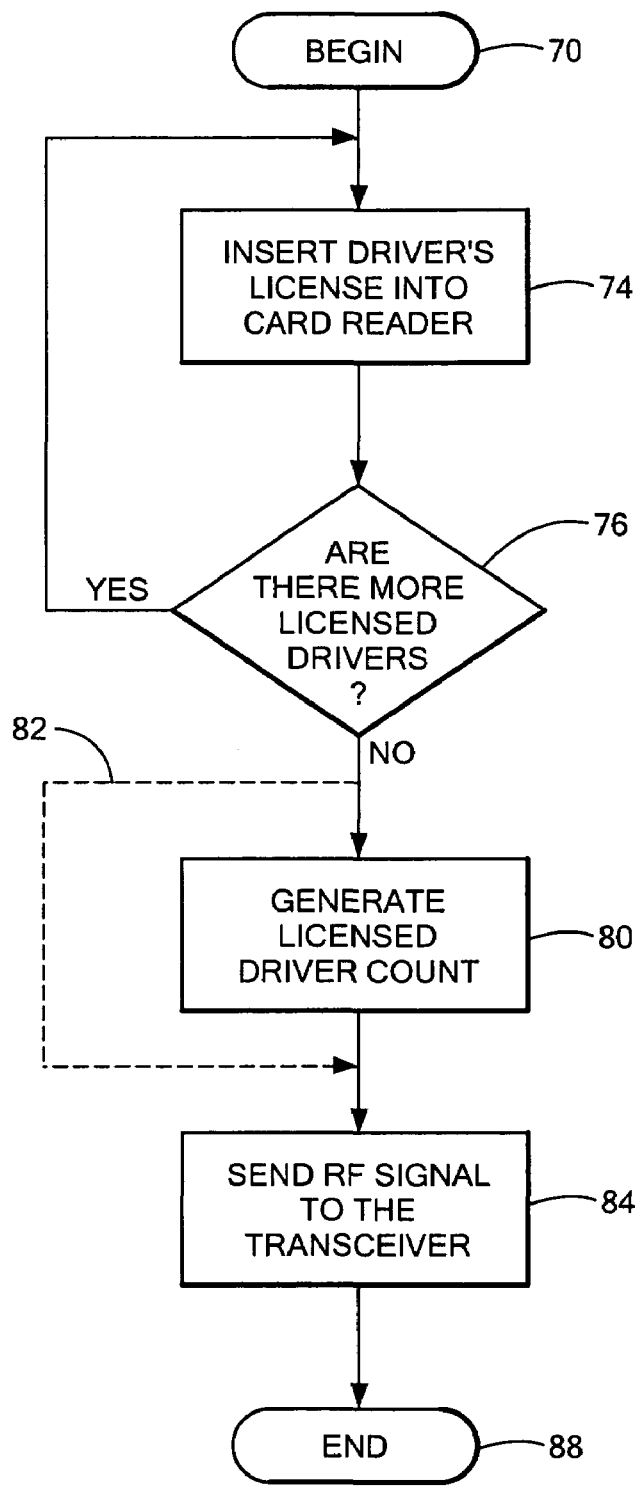
FIG. 3 is a flow diagram of a toll collection process according to the invention.

Referring also to FIG. 3, a flow diagram of an illustrative toll collection method for an HOT lane according to the invention is shown. The process of FIG. 3 commences at block 70, following which a driver's license is inserted into the card reader 50 in block 74. An indication may be provided to the user, with the user interface 46, to indicate that the information from the driver's license has been successfully read (i.e., that a driver's license has been detected). In block 76, it is determined whether there are any more licensed drivers in the vehicle. If there are additional licensed drivers in the vehicle, then block 74 is repeated as shown.

If there are no more licensed drivers in the vehicle, then, in block 80, a licensed driver count is generated. The licensed driver count is a signal related the number of driver's licenses read by the card reader. In one embodiment, the licensed driver count is equal to the number of driver's licenses read by the card reader and in an alternative embodiment, the licensed driver count is equal to the number of valid driver's licenses read by the card reader.

In block 84, an RF signal including the licensed driver count is sent to a roadside transceiver 24a–24c for a determination of a toll amount for the vehicle. As noted above, depending on whether the roadway utilizes an open or closed toll collection model, the transceiver may be at a predetermined point on the roadway (open collection system) or at the exit point of the vehicle from the roadway (closed collection system).

In an alternative embodiment illustrated by dotted line 82, the raw data read from one or more driver's licenses inserted into the card reader is transmitted to the transceiver and so block 80 is bypassed, as shown. In this case, the transceiver, or other processing unit or system coupled to the transceiver, processes the driver's license information and provides the licensed driver count and the further toll amount determination. However, use of this alternative embodiment may raise privacy issues associated with transmitting information pertaining to the licensed drivers in the vehicle. Thus, additional security measures, such as data encryption, may be required.

The transceiver processor (or processor of a computer system to which the transceiver is coupled) determines an appropriate toll amount for the vehicle based on the licensed driver count in one embodiment, the HOT lane 20 may be used by any vehicle with a transponder and discounted or free passage is provided to vehicles carrying more than one licensed driver. Specifically, a full toll is charged to a transponder with no license or one license inserted in the card reader or to vehicles without a transponder having a card reader installed. In other words, the full toll is charged to vehicles containing a transponder without a card reader. A discounted toll is charged to transponders having two driver's licenses inserted into the card reader and no toll is charged to transponders having three licenses inserted into the card reader. And a premium toll may be charged or an enforcement action may be taken as to vehicles without any transponder installed.

Various techniques are possible to detect vehicles without any transponder installed. For example, a light may be provided on a pole supporting the receive antenna of a transceiver 24a and the light is illuminated only in response to receipt of an RF signal from a transponder 30. A police officer positioned to view the light can then take enforcement action against vehicles passing by the transceiver 24a without illuminating the light. As another alternative, a system may be used to correlate the number of vehicles passing by a transceiver with the number of RF signals received from transponders 30.

Emergency vehicles and/or buses may be exempted from tolls by equipping such vehicles with transponders 30 whose transponder numbers are registered as toll-exempt, or by including the license plate numbers of these vehicles in a toll-exempt list.

One or more additional factors may be taken into account in the determination of the appropriate toll amount for the vehicle. As one example, a current level of service may be used to dynamically determine toll rates. The level of service refers to a measure of lane density (e.g., the number of vehicles per lane per mile).

With the above-described methods and apparatus, the intent of HOT lanes, of reducing the demand for the roadway, is met. This is achieved by requiring multiple licensed drivers be in the same vehicle, rather than just multiple persons, since the presence of unlicensed drivers in an HOT lane does not reduce roadway demand.

It will be appreciated that the presence of a driver's license in the vehicle 28 is equated with the driver identified on the license being present in the vehicle. And thus, detecting a number of driver's licenses inserted into the card reader is intended to provide an indication of the number of licensed drivers in the vehicle. It is understood however that the toll collection system of the present invention could be usurped by a licensed driver giving his or her driver's license to another driver but not being present in the other driver's vehicle for use in fraudulently increasing the licensed driver count of the invention for the unlawful purpose of defrauding the toll collection system. It is felt however, that the threat of law enforcement action, both against the vehicle driver for fraudulently using the driver's license of a non-occupant to indicate an elevated number of licensed drivers present in the vehicle and against the lending driver for driving without a license, would deter such unlawful action.

Enforcement of the toll collection method and apparatus of the invention may take various forms. For example, the name or driver's license number of those who do not pay their toll bills may be placed on an enforcement list, along with users of stolen or otherwise invalid transponders. When a vehicle is detected to contain the driver's license of the violator, a message is sent to a mobile computer which can be installed in police vehicles, notifying the officer of the time and place of passage of the vehicle. Further, a video system can be installed at one or more transceiver locations to generate a transaction report including a license plate number obtained by optical character recognition (OCR) processing of video images. The report can also include a video clip of the vehicle as it passes the tolling point, from which a reviewer can often determine the number occupants in the vehicle. Once a violator or suspected violator is detected, the license plate number is used to collect all other stored transactions with the same license plate. These other transactions can then be used to confirm habitual violator behavior and to direct enforcement to the most likely time and place for capture of the violator.

Having described the preferred embodiments of the invention, it will now become apparent to one of ordinary skill in the art that other embodiments incorporating their concepts may be used.

It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A method of collecting tolls on a high occupancy toll lane comprising:
   detecting a count of driver's licenses inserted into a card reader located in a vehicle using the high occupancy toll lane; and
   transmitting the count of driver's licenses to a roadside transceiver for a determination of a toll amount for the vehicle based on the count of driver's licenses.

2. The method of claim 1 wherein detecting comprises reading information from the driver's licenses inserted into the card reader.

3. The method of claim 2 wherein the information is read from at least one of a bar code or a magnetic strip of the driver's license.

4. The method of claim 1 wherein detecting includes determining if each of the driver's licenses inserted into the card reader is valid and wherein transmitting includes transmitting the count of valid driver's licenses to the roadside transceiver.

5. The method of claim 1 wherein the determination of the toll amount is further based on a current level of service.

6. The method of claim 1, wherein the count of driver's licenses is indicative of a count of licensed drivers inside the vehicle, and wherein the determination of the toll amount is based on the count of licensed drivers.

7. The method of claim 1, further comprising:
   detecting a second vehicle that does not transmit a count of driver's licenses associated with the second vehicle; and
   generating an alert in response to the detection of the second vehicle.

8. The method of claim 7, wherein the generating the alert comprises illuminating a light along a roadway in response to the detection of the second vehicle.

9. A toll collection system comprising:
   a transceiver positioned adjacent to a lane and including a receiver for receiving radio frequency signals; and
   a transponder positioned on a vehicle using the lane and comprising a card reader for reading information from one or more driver's licenses inserted into the card reader and a processor operative to generate a licensed driver count related to a count of the driver's licenses inserted into the card reader, wherein the transponder further comprises a transmitter for transmitting a radio frequency signal indicative of the licensed driver count to the transceiver.

10. The toll collection system of claim 9 wherein the transceiver is associated with a processor that is responsive to the licensed driver count for determining a toll amount for the vehicle.

11. The toll collection system of claim 10 wherein the processor is further responsive to a current level of service for determining the toll amount for the vehicle.

12. The toll collection system of claim 9 wherein the licensed driver count is indicative of a count of valid driver's licenses in the vehicle.

13. The toll collection system of claim 9, further comprising:
   an alerting device coupled to the transceiver and adapted to generate and alert in response to a detection of a second vehicle that does not transmit a count of driver's licenses associated with the second vehicle.

14. The toll collection system of claim 13, wherein the alerting device comprises a light adapted to illuminate in response to a detection of a second vehicle that does not transmit a count of driver's licenses associated with the second vehicle.

15. A transponder located on a vehicle and adapted for use on a high occupancy toll lane, comprising a card reader for reading information from one or more driver's licenses inserted into the card reader, wherein the transponder includes a processor operative to generate a licensed driver count indicative of a count of driver's licenses inserted into the card reader.

16. The transponder of claim 15 further comprising a transmitter for transmitting an RF signal to a roadway transceiver and indicative of the licensed driver count.

17. The transponder of claim 15 wherein the processor is operative to determine if a driver's license is valid and the licensed driver count is indicative of a count of valid driver's licenses inserted into the card reader.

* * * * *

UNITED STATES PATENT AND TRADEMARK OFFICE
CERTIFICATE OF CORRECTION

| | | |
|---|---|---|
| PATENT NO. | : 7,091,880 B2 | Page 1 of 1 |
| APPLICATION NO. | : 10/891824 | |
| DATED | : August 15, 2006 | |
| INVENTOR(S) | : Roger G. Sorensen | |

It is certified that error appears in the above-identified patent and that said Letters Patent is hereby corrected as shown below:

Column 2, line 67 delete "Raytheon Company, Lexington, Mass.," and replace with --Raytheon Company, Watham, Mass.,--

Column 3, line 6 delete "may transit" and replace with --may transmit--.

Column 4, line 53 delete "inserted the card" and replace with --inserted into the card--.

Column 5, line 14 delete "an HOT Lane" and replace with --a HOT lane--.

Column 5, line 27 delete "related the number" and replace with --related to the number--.

Column 5, line 57 delete "driver count in one" and replace with --driver count. In one--.

Column 6, line 30 delete "an HOT" and replace with --a HOT--.

Column 6, line 63 delete "number occupants" and replace with --number of occupants--.

Signed and Sealed this

Sixteenth Day of January, 2007

JON W. DUDAS
*Director of the United States Patent and Trademark Office*